(12) United States Patent
Abts et al.

(10) Patent No.: US 10,384,557 B2
(45) Date of Patent: Aug. 20, 2019

(54) IRRIGATION SYSTEM WITH POSITION-BASED PREDICTIVE ANALYTICS

(71) Applicant: Irrovation LLC, Omaha, NE (US)

(72) Inventors: Gerald L. Abts, Denver, CO (US); Kevin J. Abts, Broomfield, CO (US)

(73) Assignee: Irrovation LLC, Omaha, NE (US)

( * ) Notice: Subject to any disclaimer, the term of this patent is extended or adjusted under 35 U.S.C. 154(b) by 0 days.

(21) Appl. No.: 15/612,869

(22) Filed: Jun. 2, 2017

(65) Prior Publication Data

US 2017/0349060 A1    Dec. 7, 2017

Related U.S. Application Data

(60) Provisional application No. 62/344,546, filed on Jun. 2, 2016.

(51) Int. Cl.
*B60L 15/20* (2006.01)
*A01G 25/09* (2006.01)
*B60L 3/12* (2006.01)

(52) U.S. Cl.
CPC ............ *B60L 15/20* (2013.01); *A01G 25/092* (2013.01); *B60L 3/12* (2013.01); *B60L 2240/421* (2013.01); *B60L 2260/50* (2013.01); *Y02T 10/645* (2013.01); *Y02T 10/7275* (2013.01)

(58) Field of Classification Search
CPC .................................. B60L 15/20; G05D 3/00
See application file for complete search history.

(56) References Cited

U.S. PATENT DOCUMENTS

| | | | |
|---|---|---|---|
| 3,807,436 A | 4/1974 | Pringle | |
| 3,823,730 A | 7/1974 | Sandstrom et al. | |
| 4,034,778 A | 7/1977 | Sage et al. | |
| 4,290,559 A * | 9/1981 | Mayer | A01G 25/09 239/737 |
| 4,508,269 A * | 4/1985 | Davis | A01G 25/092 239/729 |
| 6,095,439 A * | 8/2000 | Segal | A01G 25/092 239/69 |
| 6,755,362 B2 * | 6/2004 | Krieger | A01G 25/092 239/731 |
| 6,928,339 B2 * | 8/2005 | Barker | A01G 25/092 239/739 |
| 7,584,053 B2 | 9/2009 | Abts | |
| 8,028,470 B2 * | 10/2011 | Anderson | A01G 25/167 47/48.5 |
| 8,738,212 B1 * | 5/2014 | Schieffelin | H04W 4/70 701/22 |
| 8,948,979 B2 | 2/2015 | Malsam | |
| 9,329,580 B2 | 5/2016 | Heuert et al. | |
| 9,374,949 B2 | 6/2016 | Abts et al. | |
| 9,459,628 B1 | 10/2016 | Abts | |
| 9,661,808 B2 * | 5/2017 | Abts | A01G 25/092 |
| 9,874,489 B1 * | 1/2018 | Jerphagnon | G01M 3/04 |

(Continued)

*Primary Examiner* — Alex C Dunn
(74) *Attorney, Agent, or Firm* — Dorr, Carson & Birney PC

(57) ABSTRACT

An irrigation system with a variable-speed drive assembly compares electric power data of a motor as a function of the location of the motor against stored historical electric power data for the motor to determine acceptable electric power data thresholds for purposes of diagnosing and predicting pending functionality complications of the variable-speed drive assembly.

12 Claims, 16 Drawing Sheets

(56) References Cited

U.S. PATENT DOCUMENTS

| | | | |
|---|---|---|---|
| 9,888,081 B1* | 2/2018 | Farinelli, Jr. | H04W 40/20 |
| 2007/0267524 A1* | 11/2007 | Mack | A01G 25/092 |
| | | | 239/729 |
| 2012/0305682 A1 | 12/2012 | Korus | |
| 2013/0018509 A1* | 1/2013 | Korus | A01G 25/092 |
| | | | 700/275 |
| 2013/0041537 A1* | 2/2013 | Malsam | A01G 25/095 |
| | | | 701/22 |
| 2013/0090766 A1* | 4/2013 | Pfrenger | A01G 25/092 |
| | | | 700/275 |
| 2013/0218402 A1* | 8/2013 | Hoshihara | B60L 53/60 |
| | | | 701/32.3 |
| 2013/0226356 A1* | 8/2013 | Pfrenger | A01G 25/092 |
| | | | 700/284 |
| 2013/0153752 A1 | 9/2013 | Grabow | |
| 2013/0253752 A1* | 9/2013 | Grabow | G05D 1/0278 |
| | | | 701/25 |
| 2013/0341419 A1* | 12/2013 | Pfrenger | A01G 25/097 |
| | | | 239/1 |
| 2014/0263706 A1* | 9/2014 | Wolgast | A01G 25/092 |
| | | | 239/11 |
| 2014/0326808 A1* | 11/2014 | Malsam | A01G 25/092 |
| | | | 239/728 |
| 2015/0060580 A1* | 3/2015 | Welch | A01G 25/092 |
| | | | 239/729 |
| 2015/0102136 A1* | 4/2015 | Malsam | A01G 25/092 |
| | | | 239/731 |
| 2015/0129680 A1* | 5/2015 | Abts | A01G 25/092 |
| | | | 239/73 |
| 2015/0150200 A1* | 6/2015 | Abts | A01G 25/092 |
| | | | 239/71 |
| 2015/0351335 A1* | 12/2015 | Abts | A01G 25/092 |
| | | | 239/728 |
| 2016/0014982 A1* | 1/2016 | Malsam | A01G 25/092 |
| | | | 239/73 |
| 2016/0103162 A1* | 4/2016 | Safa-Bakhsh | B60R 16/03 |
| | | | 702/62 |

* cited by examiner

IRRIGATION SYSTEM WITH POSITION-BASED PREDICTIVE ANALYTICS

BACKGROUND OF THE INVENTION

Field of the Invention

The present invention relates generally to the field of irrigation monitoring systems. More specifically, the present invention monitors electric power data obtained from a power sensor of a variable-speed drive assembly, and compares this data against historical electric power data to detect anomalies for the purposes of diagnosing and predicting pending functionality complications of the variable-speed drive assemblies. Detection of such anomalies can be used to trigger real-time status notifications to the irrigation system operator to help prevent failures that might result in costly downtime.

Statement of the Problem

The present invention involves an irrigation system having a series of irrigator spans having conduits for conveying an applicant such as water. The present invention can be used in conjunction with various types of irrigation systems including linear and lateral move irrigation systems. However, the primary type of irrigation system used for this purpose is known as a center pivot irrigation system. Such systems include a center pivot tower about which the entire irrigation system rotates. The center pivot tower may be connected to the water source for supplying water to the irrigation system. The irrigation system may further include a series of irrigator spans having conduits for conveying the water. Each irrigator span may be connected to the adjacent irrigator span in an end-to-end manner at a joint that may include an external ball and socket connection, an external gimbal ring assembly, an external tongue and pin assembly, or an internal hook and eye assembly. A flexible coupling may be used to connect the conduits of adjoining irrigator spans such that each conduit may be in fluid communication with the next. The conduit of the irrigator span positioned adjacent to the center pivot tower may be connected to the center pivot tower and the water source. Water may be pumped from the water source through the center pivot tower and to the conduits of each irrigator span and may be applied to the field through discharge nozzles mounted to the conduits. The irrigation system may include a plurality of irrigator spans, typically 100 feet to 200 feet in length, capable of reaching a few acres or hundreds of acres of the field. The irrigator spans may each be supported by a corresponding wheel tower structure and may be moved about the center pivot tower by a variable-speed drive assembly of a corresponding wheel tower structure. The variable-speed drive assembly is typically comprised of drivetrain components such as variable-speed drive controllers, electric motors, wheel gearboxes, wheels, and optional power sensors, location sensors, memory, processors and wireless data communication devices for moving the irrigator span radially about the center pivot tower.

The prior art in this field includes irrigator span alignment systems that may use sensors to detect degrees of misalignment between adjacent irrigator spans and, in turn, may signal variable-speed drive controllers to vary electric motor speeds in order to maintain alignment of corresponding irrigator spans.

U.S. Pat. No. 6,755,362 (Krieger et al.) and U.S. Pat. No. 8,948,979 (Malsam) disclose an irrigation system, such as a center pivot irrigation system, that includes a variable-speed drive controller for varying the speed of an electric motor of a wheel tower structure of an irrigator span to maintain alignment of a plurality of irrigator spans moving about the center pivot tower.

As a result of continuous operation at a wide range of irrigation system speeds in unfavorable environments that may include muddy fields, varying terrains and high temperatures, center pivot irrigation systems, and more specifically the drivetrain components of a variable-speed drive assembly of a wheel tower structure of an irrigator span, may often encounter a multitude of technical and operational complications such as underinflated wheel tires, malfunctioning variable-speed drive controllers, defective electric motors, inoperative wheel gearboxes, and wheels slipping and getting stuck in the mud at recurring locations in the field. These complications, however, may often times be mitigated and continuous operation maintained if detected in advance of catastrophic failure.

Solution to the Problem

The present invention incorporates position-based predictive analytics into variable-speed drive assemblies of irrigation systems for the purpose of analyzing electric power data that may then be used to determine if there are operational anomalies present in the variable-speed drive assemblies.

SUMMARY OF THE INVENTION

The present invention provides an irrigation system with position-based predictive analytics for variable-speed drive assemblies of a wheel tower structure of an irrigator span for purposes of site-specific variable-speed drive assembly diagnostics and real-time status notifications to the irrigation system operator. This may be greatly beneficial in helping the irrigation system operator initiate preventative maintenance and reduce costly irrigation system downtime.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
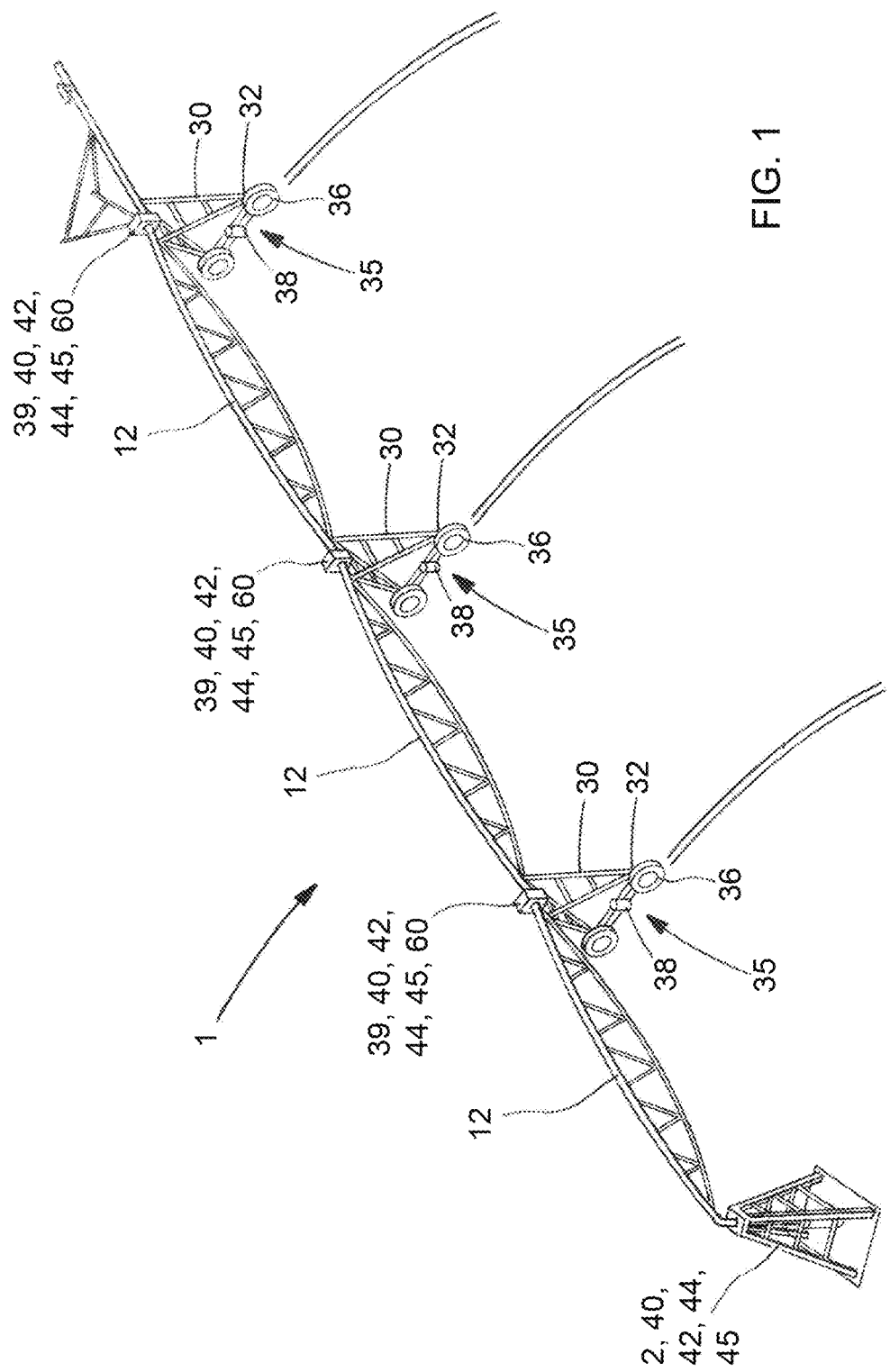
FIG. 1 is a perspective view of an irrigation system 1 embodying the present invention.

Irrigation systems 1, such as linear and lateral move irrigation systems 1 and center pivot irrigation systems 1, may include variable-speed drive assemblies 35 at each of the wheel tower structures 30 of irrigator spans 12 to propel the irrigation systems 1 over a respective ground surface, cultivation area or field. Such irrigation systems 1, and more specifically the drivetrain components of variable-speed drive assemblies 35 of wheel tower structures 30 of irrigator spans 12, operating continuously at a wide range of irrigation system 1 speeds in unfavorable environments that may include muddy fields, varying terrains and high temperatures, often may encounter a multitude of technical and operational complications such as underinflated wheel 36 tires, malfunctioning variable-speed drive controllers 39, defective electric motors 38, inoperative wheel gearboxes 32, and wheels 36 slipping and getting stuck in the mud. These drivetrain component complications, however, may often times be mitigated and continuous operation maintained if they are detected in advance of catastrophic failure.

The following is an example of an implementation of the present invention using power sensors 60 either internal to variable-speed drive controllers 39 or as devices external to variable-speed drive controllers 39. FIG. 1 illustrates a center pivot irrigation system 1 with a center pivot tower 2 and irrigator spans 12 being supported by wheel tower structures 30 and in accordance with an embodiment of the present invention using variable-speed drive assemblies 35 comprised of drivetrain components that include variable-speed drive controllers 39, electric motors 38, wheel gearboxes 32, wheels 36, and optional power sensors 60, location sensors 40, memory 44, processors 45 and wireless data communications devices 42.

Figure 2A:
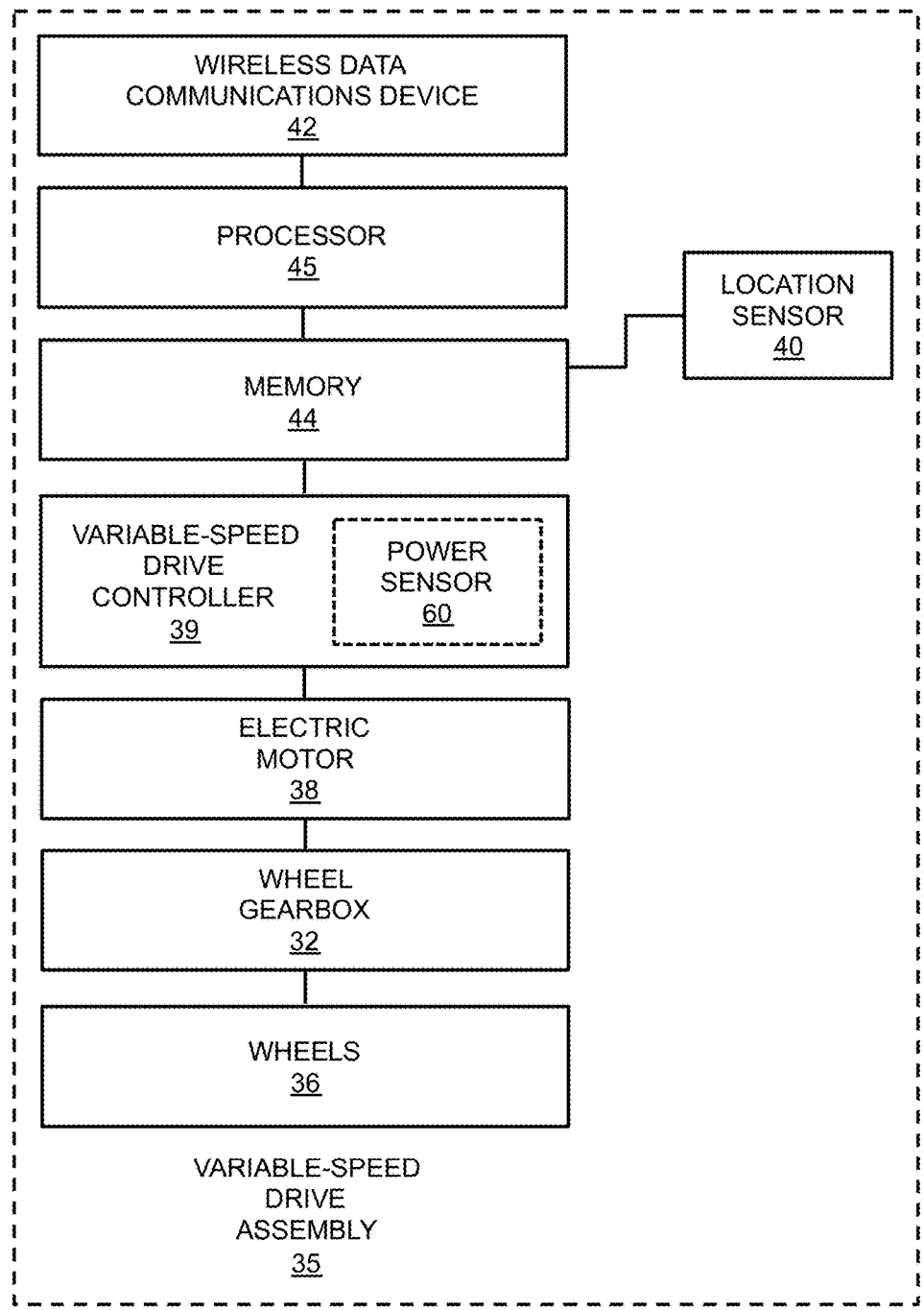
FIG. 2A is a block diagram showing the drivetrain components of the variable-speed drive assembly 35 of a wheel tower structure 30 of an irrigator span 12 with a variable-speed drive controller 39 utilizing an internal power sensor 60.
Figure 2B:
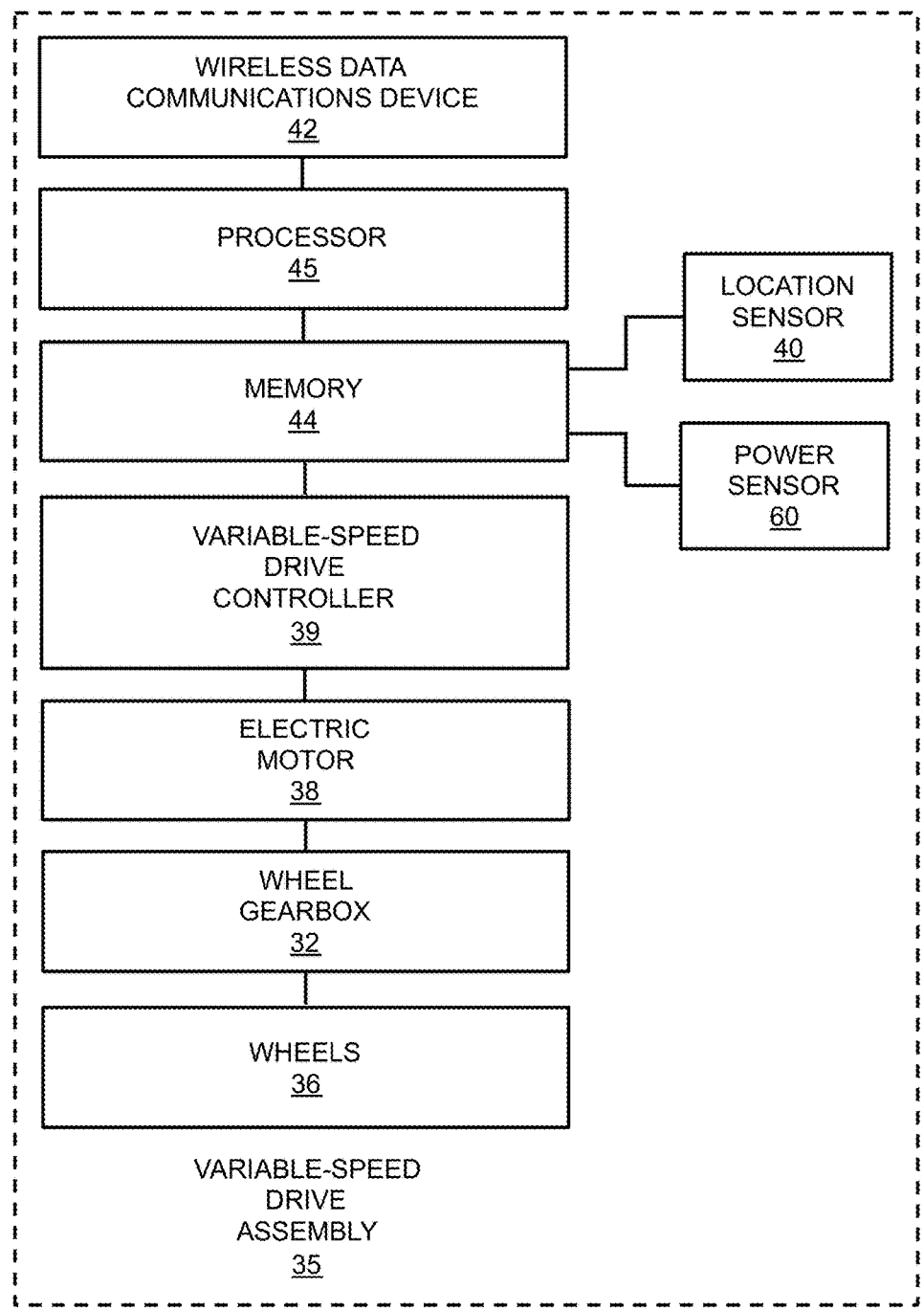
FIG. 2B is a block diagram showing the drivetrain components of the variable-speed drive assembly 35 of a wheel tower structure 30 of an irrigator span 12 with an external power sensor 60.

FIG. 2A illustrates the drivetrain components of a variable-speed drive assembly 35 of a wheel tower structure 30 of an irrigator span 12 using a variable-speed drive controller 39 with an internal power sensor 60 while FIG. 2B illustrates the drivetrain components of a variable-speed drive assembly 35 of a wheel tower structure 30 of an irrigator span 12 using an external power sensor 60. These drivetrain components may include variable-speed drive controllers 39, electric motors 38, wheel gearboxes 32, wheels 36, and optional power sensors 60, location sensors 40, memory 44, processors 45 and wireless data communications devices 42. A non-limiting list of suitable variable-speed drive controller 39 types may include an AC (alternating current) VFD (variable frequency drive), a variable-torque V/Hz (volts-per-hertz) control VFD, a flux control VFD, a DTC (direct torque control) VFD, a sensorless vector control VFD, a sensored vector control VFD, a brush type DC (direct current) variable-drive control unit, and a DC variable-drive control unit, and the like, all with or without an internal or an external microcontroller or an internal or an external PLC.

There may be many versions of variable-speed drive controllers 39, each of which may be typically configured to be programmed for different operational outputs and communicated with via any of a variety of communications protocols including Modbus, RS-485, RS-232, etc. The variable-speed drive controllers 39 may also incorporate intelligence in the form of either an internal memory 44 and an internal processor 45 or utilize outside intelligence in the form of either an external memory 44 and an external processor 45, e.g., PLC (programmable logic controller). If external, these external memory 44 and external processors 45 may communicate with or be connected to the variable-speed drive controllers 39 using the above listed serial communications protocols. These same serial communications protocols may also be used by the variable-speed drive controller 39 or connected external memory 44 and external processor 45 to communicate with or connect to a RTU (remote telemetry unit) where SCADA (supervisory control and data acquisition) may be required for the purpose of incorporating a wireless data communications device 42 with the variable-speed drive controller 39 or external processor 45.

Variable-speed drive controllers 39 are commonly used in electro-mechanical drive systems to control electric motor 38 speed and torque by varying the electric motor 38 input frequency and voltage. During operation, these variable-speed drive controllers 39 often use internal power sensors 60 to measure, monitor, record, receive, obtain, detect, store and display status information such as power (kilowatts), voltage (volts), frequency (Hertz), current (amperes), etc., pertaining to the electric power of the variable-speed drive controller 39 supplied to the electric motor 38. Such status information may simply represent various electric power data 64 being supplied to the electric motor 38 of a variable-speed drive assembly 35 and may further be measured, monitored, recorded, received, obtained, detected, stored and displayed by a variety of conventional external electric power sensors 60, sometimes also referred to as electric power meters, electricity meters, voltmeters, ammeters, wattmeters, frequency meters, etc. In the event of complications resulting from underinflated wheel 36 tires, malfunctioning variable-speed drive controllers 39, defective electric motors 38, inoperative wheel gearboxes 32, and wheels 36 slipping and getting stuck in the mud at recurring locations in the field, the historical electric power data trends 52 may deviate substantially from the electric power data 64 sensed when the drivetrain components are operating properly and the variable-speed drive assembly 35 is functioning normally.

For example, a flat wheel 36 tire may cause significant drag on the electric motor 38 that may then cause the current drawn by the electric motor 38 to increase above an acceptable operational threshold beyond that normally supplied by the variable-speed drive controller 39. Other examples of detectable complications may include variable-speed drive controllers 39 overheating, electric motor 38 wire windings failing, wheel gearbox 32 worm gears intermittently locking up, or even a wheel 36 slipping in the mud at a recurring location in the field.

Because the electric power data 64 being measured, recorded, received, obtained, detected, stored and displayed by each variable-speed drive controller 39 or measured, monitored, obtained and detected by power sensors 60 may change substantially as a result of external environmental factors during the operation of the irrigation system 1 and relative to its location in the field, it may be necessary to utilize position-based electric power data nodes 50 for georeferencing the site-specific locations that the electric power data 64 may be measured, recorded, received, obtained, detected, stored and displayed. Once the site-specific locations have been established and the position-based electric power data nodes 50 are within range, such measurements may be taken at instantaneous intervals, continuous intervals, or over short packets or lengths of time, i.e., several minutes or hours.

For example, variations in the terrain and the types of soil in the field may result in the need for an increase in power to move the irrigation system 1 up a hill, down through a muddy draw or over a slippery soil type such as clay. Even though these variations in the terrain and the soil types may be fixed, they may present consistent problems as the irrigation system 1 repeatedly moves in and out of these fixed locations in the field. It may be necessary, therefore, to continually georeference the electric power data 64 being supplied by each variable-speed drive controller 39 in order to create historical electric power data trends 52 for each power sensor 60 across multiple site-specific locations in the field to determine acceptable electric power data thresholds 54 before predictive analytics may be used to determine whether the electric power data 64 are consistent with normal variable-speed drive assembly 35 operation or may be indicative of complications.

The position-based predictive analytics may be achieved by incorporating electric power data 64, being supplied at each variable-speed drive controller 39 and sensed by power sensors 60, into position-based electric power data nodes 50 that may then be plotted as historical electric power data trends 52 to determine acceptable electric power data thresholds 54 of normal variable-speed drive assembly 35 operation. It may require more than one complete revolution of the irrigation system 1 to collect a sufficient amount of electric power data 64 to create historical electric power data trends 52 and determine acceptable electric power data thresholds 54. Furthermore, it may require continual updates to historical electric power data trends 52 as adjustments in irrigation system 1 speed by the operator may result in slight differences in electric power data 64 at each position-based electric power data node 50. These light differences may be easily accounted for by simply referencing the irrigation system 1 speed with each historical electric power data trend 52, i.e., electric power data heat map 62. Last, the number of position-based electric power data nodes 50 may vary greatly depending on the overall level of accuracy and response time desired by the irrigation system 1 operator, however, the position of the position-based electric power data nodes 50 along the length of the irrigation system 1 may generally correspond to a position in close proximity to the variable-speed drive assembly 35 that may be configured for position-based predictive analytics.

Once acceptable electric power data thresholds 54 have been determined for each power sensor 60 and at multiple site-specific locations in the field, real-time electric power data 64 at each site-specific location in the field may be comparatively analyzed against historical electric power data trends 52 at the same site-specific locations in the field to determine if the real-time electric power data 64 are inside or outside acceptable electric power data thresholds 54. The resulting determinations may then be used to signal or alert the irrigation system 1 operator of pending variable-speed drive assembly 35 complications so that the irrigation system 1 operator may perform preventative maintenance on problematic drivetrain components of the corresponding variable-speed drive assemblies 35 in advance of possible catastrophic failures that may have otherwise resulted in irrigation system 1 downtime. It is understood that position-based predictive analytics may be conventionally referred to as Industry 4.0.

Likewise, in the event of catastrophic failure of a variable-speed drive assembly 35 that results in the irrigation system 1 shutting down, these same signals to the irrigation system 1 operator may also be used to easily identify at which particular wheel tower structure 30 the variable-speed drive assembly 35 failure occurred. This may save the irrigation system 1 operator time in having to manually determine at which wheel tower structure 30 the failure occurred. In this way, the irrigator may attend directly to the particular wheel tower structure 30 without having to first spend time physically visiting each wheel tower structure 30 to make the correct determination.

Additionally, the variable-speed drive assemblies 35 may further incorporate either analog or digital diagnostic operational functionality sensors that may directly wire connect to or be in wireless communication with memory 44 for direct sensing of operational functionality of individual drivetrain components, e.g., variable-speed drive controllers 39, electric motors 38, wheel gearboxes 32, wheels 36, wheel 36 tires, etc., of variable-speed drive assemblies 35. This operational functionality information may be incorporated into the position-based electric power data nodes 50 to further enhance the disclosed method of position-based predictive analytics. It is understood that this use of sensors and sensor data may be conventionally implemented using a proportional-integral-derivative (PID) controller, algorithm, loop or control. For purposes of this disclosure, PID controllers may be used to compare historical electric power data trends 52 derived from sensors with real-time electric power data 64 derived from sensors at site-specific locations in the field georeferenced by location sensors 40 that correspond to a number of position-based electric power data nodes 50.

Examples of location sensors 40 for determining site-specific locations or positions of position-based electric power data nodes 50, whether specific to site-specific locations in the field or specific to locations along the length of an irrigation systems 1 in combination with the irrigation systems 1 degree of angular position relative to its center pivot tower or outer circumference, may include GPS (global positioning systems), rotary encoders, shaft encoders, pulse encoders, analog resolvers, digital resolvers, digital compasses, analog compasses, dead-reckoning or deduced reckoning algorithms, etc. These location sensors 40 may be located at each variable-speed drive assembly 35, e.g., directly wire connected to or in wireless communication with the memory 44 to accurately correspond with each position-based electric power data node 50, or may be located at the center pivot tower 2, at the wheel tower structure 30, at the end of the irrigation system 1 or at any location along the length of the irrigation system 1 then used in reference to each of the electric motors 38 and corresponding position-based electric power data nodes 50 by way of the irrigation systems 1 degree of angular position relative to its center pivot tower 2 or outer circumference.

Because the irrigation system 1 operator may typically not be within close proximity to the irrigation system 1 during its continuous operation, a means to wirelessly communicate real-time electric power data 64 for each position-based electric power data node 50, from the processor 45 either directly or indirectly to the irrigation system 1 operator, that may be used to identify deviations or anomalies in historical electric power data trends 52 from each processor 45 may provide a unique means of position-based predictive analytics.

Once the variable-speed drive assembly 35 complications have been diagnosed from the electric power data 64, the irrigation system 1 operator may then be notified with real-time alerts via a text message, mobile app for smartphones and tablets, web portal, website, or any cellular device, satellite device, radio device, WPAN (wireless personal area network) device such as Bluetooth or Wi-Fi, or web-enabled device mobile or otherwise. It is understood that the communication between and connectivity of a processor 45 and a web-enabled device may be conventionally referred to as IoT (Internet of Things).

Wirelessly communicating data from the processor 45 for the purpose of diagnosing complications with the drivetrain components of variable-speed drive assemblies 35 then notifying the irrigation system 1 operator in real-time may be greatly beneficial in helping the irrigation system 1 operator to initiate preventative maintenance and reduce costly irrigation system 1 downtime.

In some instances, diagnosing complications of drivetrain components of variable-speed drive assemblies 35 may be executed either within the variable-speed drive controller 39 itself with internal memory 44 and internal processor 45 or simply by an external memory 44 and external processor 45 that may be connected to the power sensors 60 and location sensors 40 via the aforementioned serial communications protocols and capable of computing variable-speed drive assembly 35 diagnostics. variable-speed drive controller Such computations may involve comparing historical electric power data trends 52 of electric power data 64 such as kilowatts, voltage, frequency and amperes being supplied to the electric motor 38 by the variable-speed drive controller 39 for the real-time electric power data 64 being supplied, measured, recorded, stored and displayed during current operations. This could be as simple as pre-determining an acceptable electric power data threshold 54 or limit for each position-based electric power data node 50 that would trigger an event to immediately notify the irrigation system 1 operator of a complication with a drivetrain component of a particular variable-speed drive assembly 35. Whether these computations take place at the irrigation system 1 via a variable-speed drive controller 39 or connected external memory 44 and external processor 45, or at a remote location via a remote supervisory computer or mobile device 46 or similar, the irrigation system 1 operator may be notified remotely of the resulting diagnosis by way of wireless data communications.

In addition to variable-speed drive assembly 35 diagnostics and real-time status notifications to the irrigation system 1 operator, the capability to remotely install or modify the software or firmware of the processor 45 via OTA (over-the-air) programming may present the irrigation system 1 operator an opportunity to easily change the operational characteristics of the processor 45 without having to be physically present in the event that modifications may be required to enhance the performance of the variable-speed drive assembly 35 of a wheel tower structure 30 of an irrigator span.

There may be several methods by which to incorporate wireless data communications into the processor 45. The first method simply plugs in or connects, either via a wire using a serial communications protocol as described above or wirelessly, the processor 45 directly to a wireless data communications device 42, e.g., cellular modem, satellite modem, digital radio modem, analog radio modem, WPAN (wireless personal area networks) modem such as Bluetooth or Wi-Fi, etc., capable of wirelessly communicating data to and from a remote supervisory computer or mobile device 46 or similar.

The second method may be the same as the first method with each wheel tower structure 30 utilizing all components of the variable-speed drive assembly 35 then simply plugs in or connects, either via a wire using a serial communications protocol as described above or wirelessly, the processor 45 directly to a wireless data communications device 42, e.g., cellular modem, satellite modem, digital radio modem, analog radio modem, WPAN (wireless personal area networks) modem such as Bluetooth or Wi-Fi, etc., capable of wirelessly communicating data to and from a remote supervisory computer or mobile device 46 or similar.

The third method may interconnect a plurality of power sensors 60, from more than one wheel tower structures 30, to a single memory 44, with its own location sensor 40 and processor 45, with either a wire in the form a serial communications protocol as described above or in the form of an Ethernet cable, networking cable, patch cable, USB cable, Cat 5e cable, Cat 6 cable, wire cable, etc., or wirelessly using a series of Zig Bee radios, XBee radios, WPANs (wireless personal area networks) such as Bluetooth or Wi-Fi, digital radios, analog radios, spread spectrum radios, etc., or any combination of the above wired or wireless methods. Only one processor 45 may then need to be connected to the wireless data communications devices 42 for wirelessly communicating data with a remote supervisory computer or mobile device 46 or similar.

The fourth method may interconnect a plurality of processors 45, each with their own location sensor 40, processor 45, memory 44, and power sensor 60, from more than one wheel tower structure 30, with either a wire in the form a serial communications protocol as described above or in the form of an Ethernet cable, networking cable, patch cable, USB cable, Cat 5e cable, Cat 6 cable, wire cable, etc., or wirelessly using a series of ZigBee radios, XBee radios, WPANs (wireless personal area networks) such as Bluetooth or Wi-Fi, digital radios, analog radios, spread spectrum radios, etc., or any combination of the above wired or wireless methods. Only one processor 45 may then need to be connected to the wireless data communications devices 42 for wirelessly communicating data with a remote supervisory computer or mobile device 46 or similar.

Figure 3A:
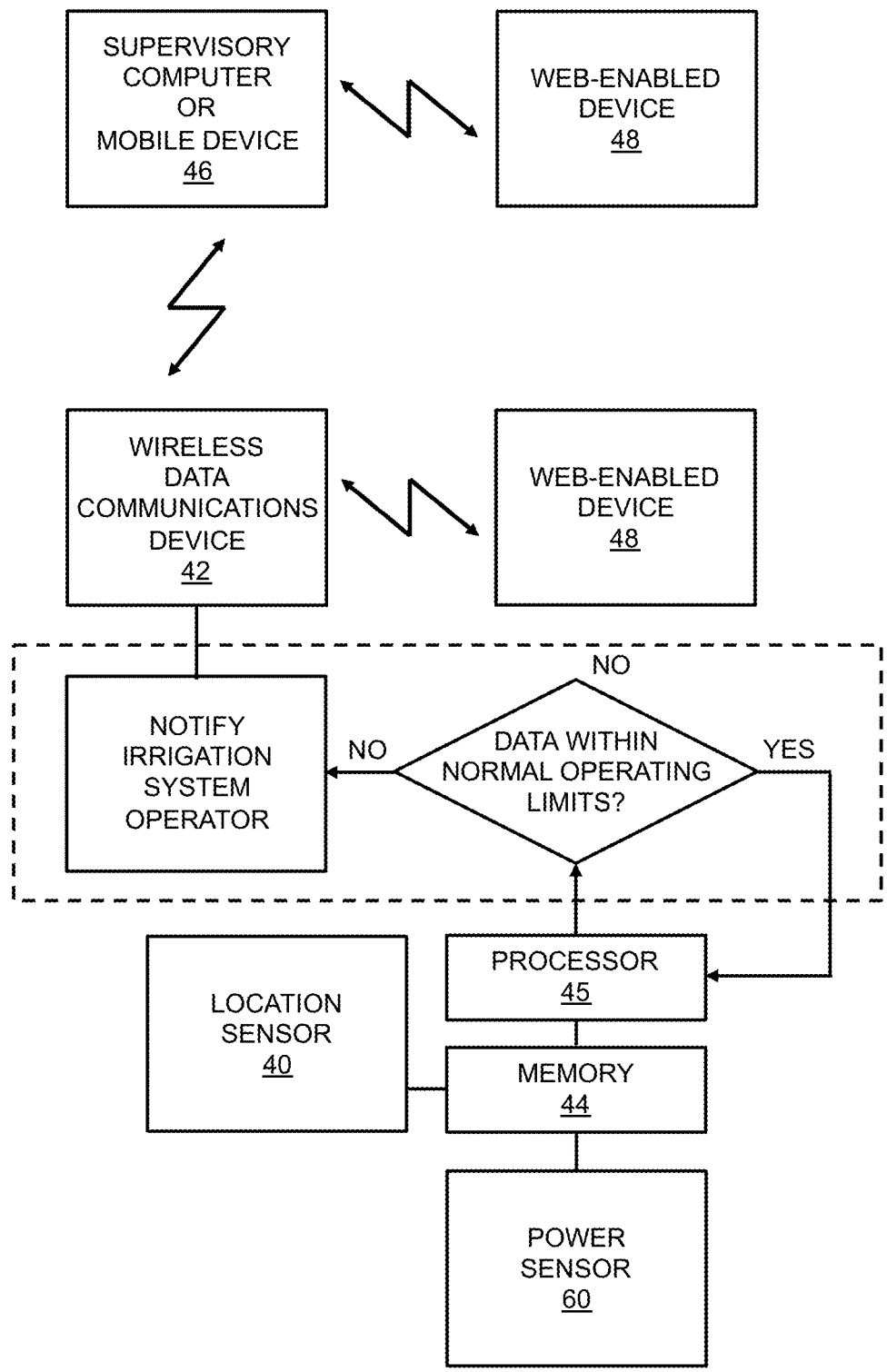
FIG. 3A is a flowchart showing a first method of locally computing position-based predictive analytics using a processor 45.

FIG. 3A illustrates the first method of locally computing position-based predictive analytics. Once the kilowatts, voltage, frequency, amperes or any other parameters of electric power data 64 sensed by the power sensor 60 may exceed an acceptable electric power data threshold 54 or limit, for the position-based electric power data nodes 50 referenced from location sensors 40, as predetermined from historical electric power data trends 52, the processor 45 may communicate to a supervisory computer or mobile device 46 or a web-enabled device 48 via a wireless data communications device 42 to notify the irrigation system 1 operator of a possible drivetrain component complication of a specific corresponding variable-speed drive assembly 35. This, in turn, may allow the operator to attend to the drivetrain component complication before catastrophic failure may occur that may ultimately result in irrigation system 1 downtime. It should be noted that other operational functionality sensors may also be connected to the memory 44 for direct monitoring and sensing of operational functionality of various individual drivetrain components of a variable-speed drive assembly 35.

Figure 3B:
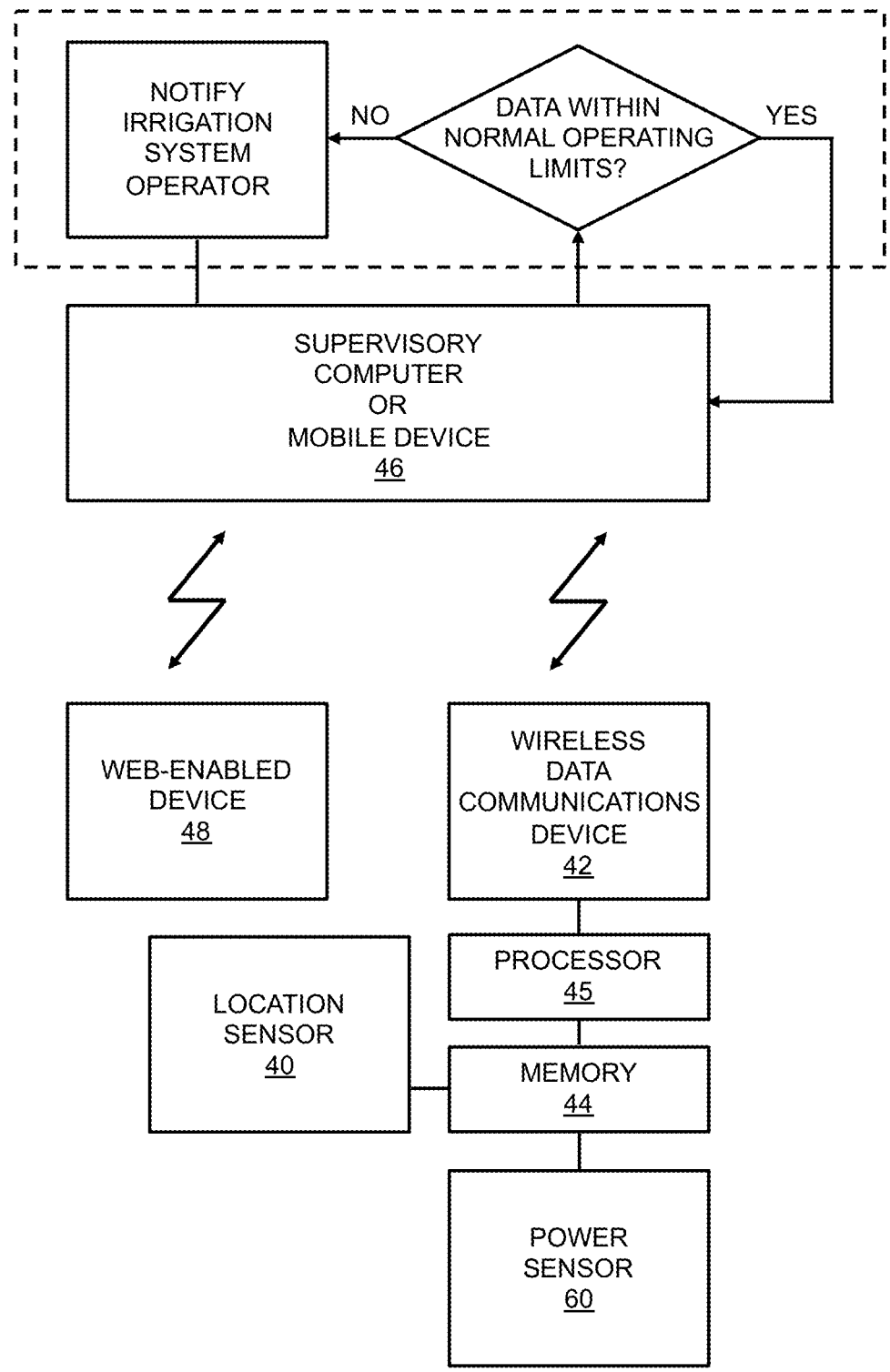
FIG. 3B is a flowchart showing a first method of remotely computing position-based predictive analytics using a supervisory computer or mobile device 46.

FIG. 3B illustrates a method of remotely computing position-based predictive analytics. The processor 45 may communicate to a supervisory computer or mobile device 46 via a wireless data communications device 42 the kilowatts, voltage, frequency, amperes or any other electric power data 64 sensed by the power sensor 60. Once the kilowatts, voltage, frequency, amperes or any other electric power data 64 sensed by the power sensor 60 may exceed an acceptable electric power data threshold 54 or limit, for the position-based electric power data nodes 50 referenced from location sensors 40, as predetermined from historical electric power data trends 52, the supervisory computer or mobile device 46 may communicate to a web-enabled device 48 to notify the irrigation system 1 operator of a possible drivetrain component complication of a specific corresponding variable-speed drive assembly 35. This, in turn, may allow the operator to attend to the drivetrain component complication before catastrophic failure may occur that may ultimately result in irrigation system 1 downtime.

Figure 4:
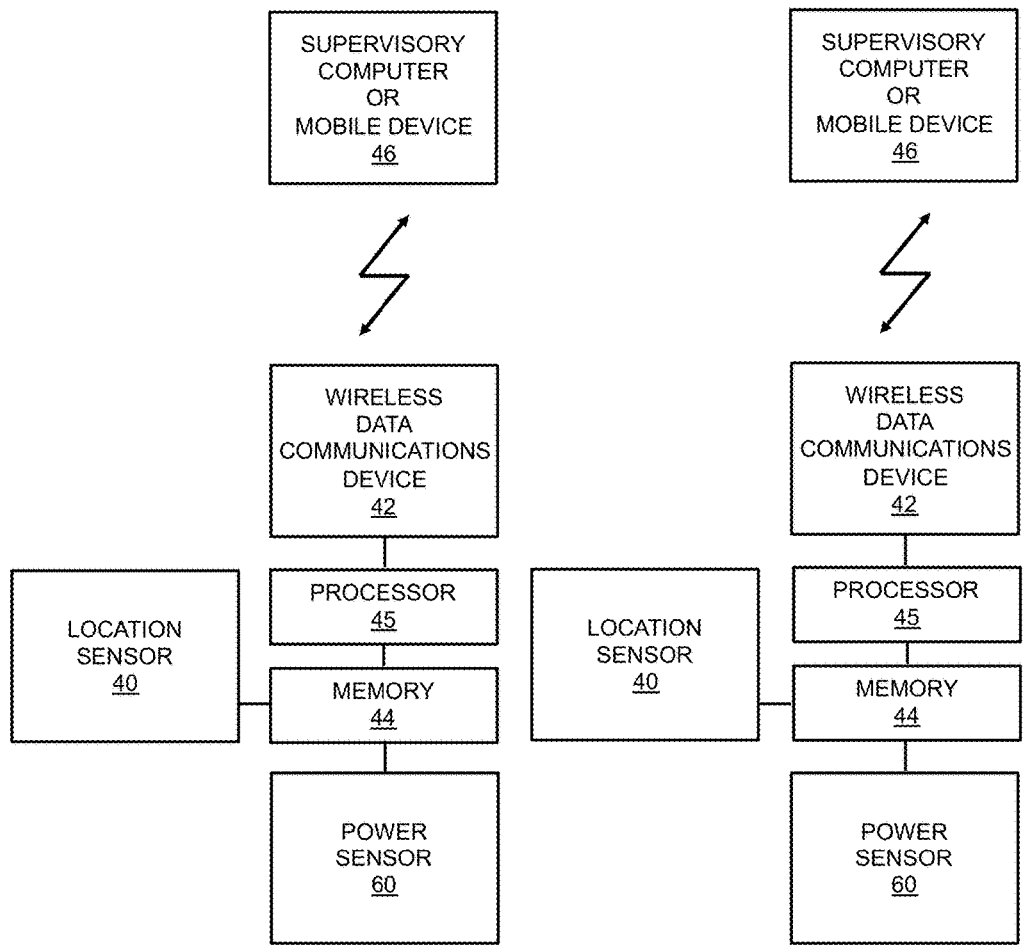
FIG. 4 is a flowchart showing a second method of remotely communicating from multiple wireless data communications devices 42 to one or more supervisory computer or mobile device 46.

FIG. 4 illustrates the second method wherein each wheel tower structure 30 utilizes all components of the variable-speed drive assembly 35 then simply plugs in or connects, either via a wire using a serial communications protocol as described above or wirelessly, the processor 45 directly to a wireless data communications device 42, e.g., cellular modem, satellite modem, digital radio modem, analog radio modem, WPAN (wireless personal area networks) modem such as Bluetooth or Wi-Fi, etc., capable of wirelessly communicating data to and from a remote supervisory computer or mobile device 46 or similar.

Figure 5A:
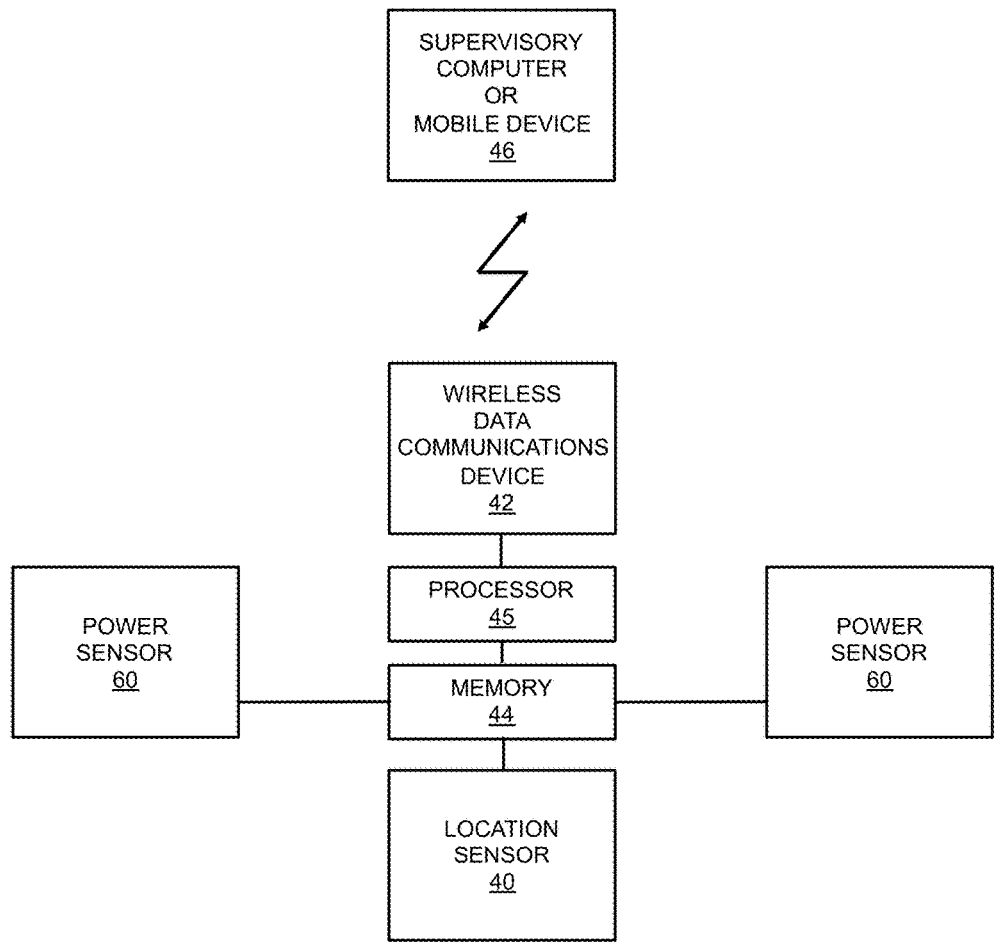
FIG. 5A is a block diagram showing a third method of position-based predictive analytics using multiple power sensors 60 connected via wire to memory 44 with a single location sensor 40.

FIG. 5A illustrates the third method wherein a plurality of power sensors 60, from more than one wheel tower structures 30, to a single memory 44, with its own location sensor 40 and processor 45, are interconnected with a wire in the form a serial communications protocol as described above or in the form of an Ethernet cable, networking cable, patch cable, USB cable, Cat 5e cable, Cat 6 cable, wire cable, etc. Only one processor 45 may then need to be connected to the wireless data communications devices 42 for wirelessly communicating data with a remote supervisory computer or mobile device 46 or similar.

Figure 5B:
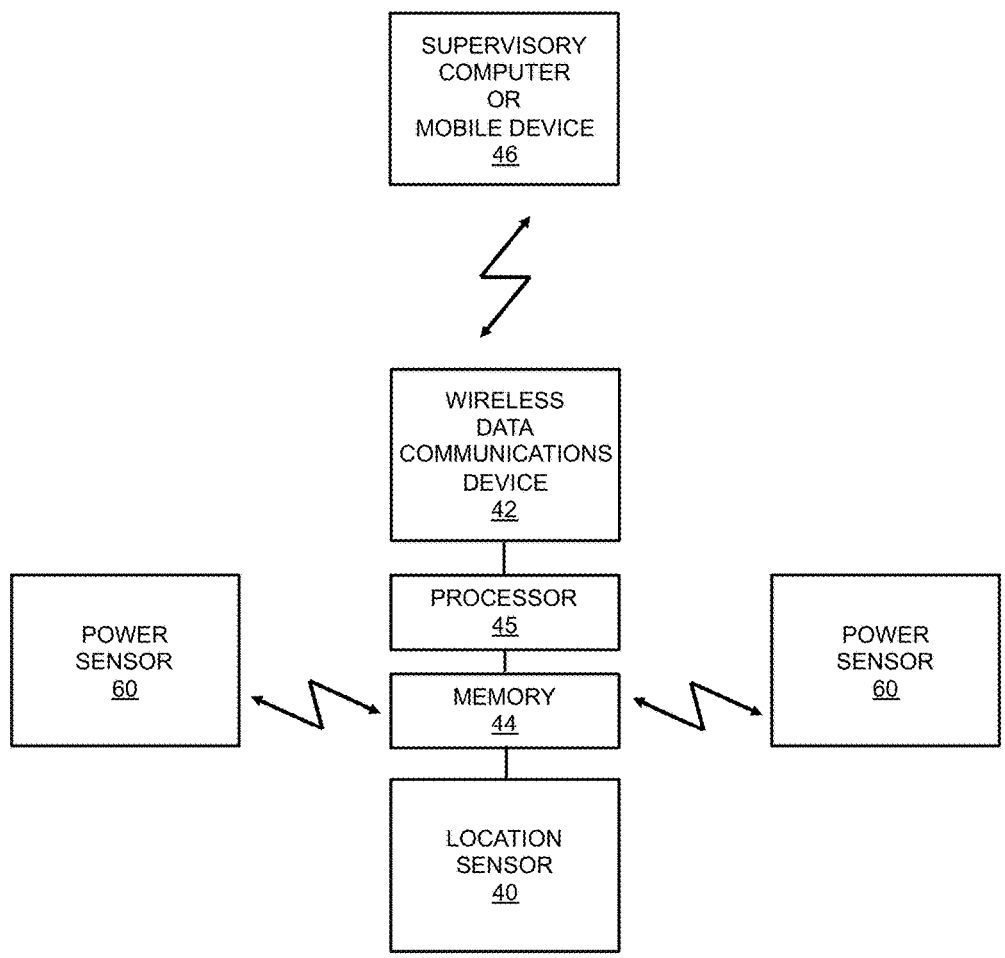
FIG. 5B is a block diagram showing a third method of position-based predictive analytics using multiple power sensors 60 connected wirelessly to memory 44 with a single location sensor 40.

FIG. 5B illustrates the third method wherein a plurality of power sensors 60, from more than one wheel tower structures 30, to a single memory 44, with its own location sensor 40 and processor 45, are interconnected wirelessly using a series of ZigBee radios, XBee radios, WPANs (wireless personal area networks) such as Bluetooth or Wi-Fi, digital radios, analog radios, spread spectrum radios, etc., or any combination of the above wired or wireless methods. Only one processor 45 may then need to be connected to the wireless data communications devices 42 for wirelessly communicating data with a remote supervisory computer or mobile device 46 or similar. It is worth noting that any combination of the above wired and wireless interconnectivity methods could be used.

Figure 6A:
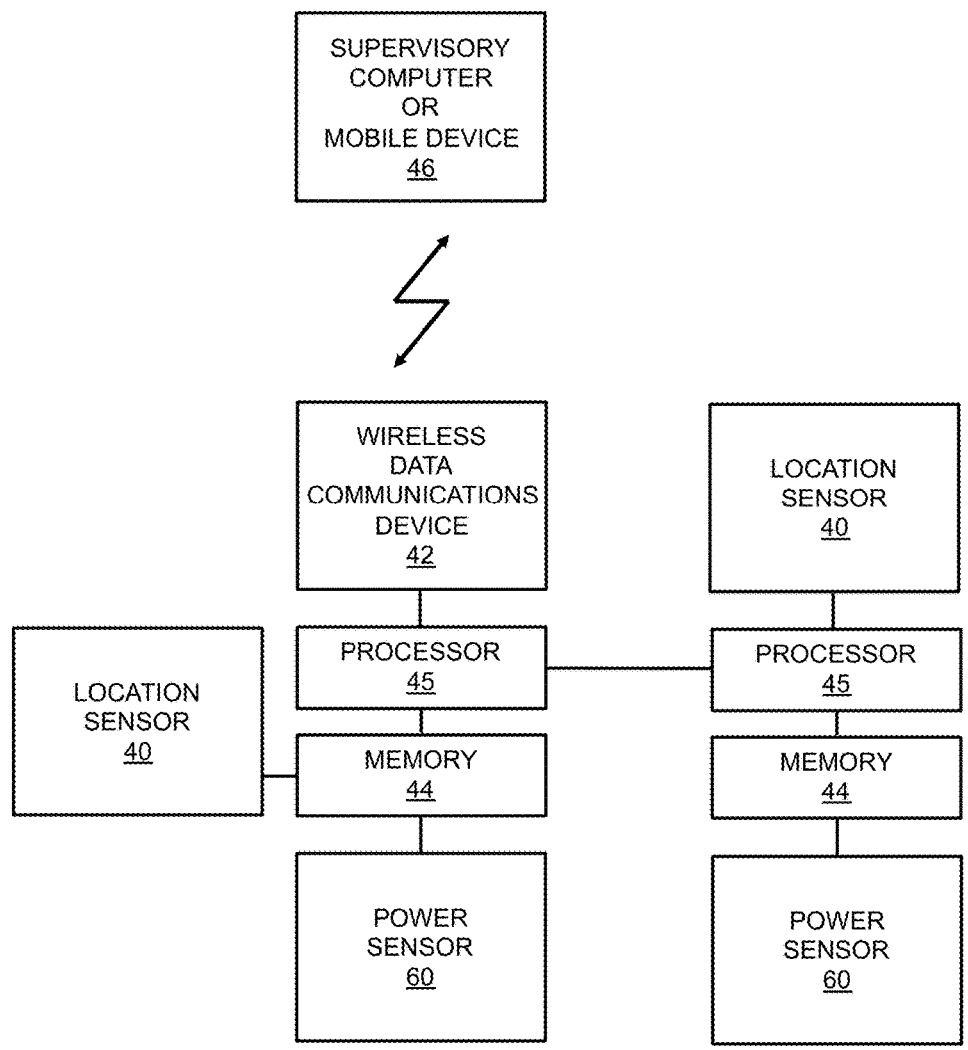
FIG. 6A is a block diagram showing a fourth method of position-based predictive analytics using multiple processors 45 interconnected via wire.

FIG. 6A illustrates the fourth method wherein a plurality of processors 45, each with their own location sensor 40, processor 45, memory 44, and power sensor 60, from more than one wheel tower structure 30, are interconnected with wire in the form a serial communications protocol as described above or in the form of an Ethernet cable, networking cable, patch cable, USB cable, Cat 5e cable, Cat 6 cable, wire cable, etc. Only one processor 45 may then need to be connected to the wireless data communications devices 42 for wirelessly communicating data with a remote supervisory computer or mobile device 46 or similar.

Figure 6B:
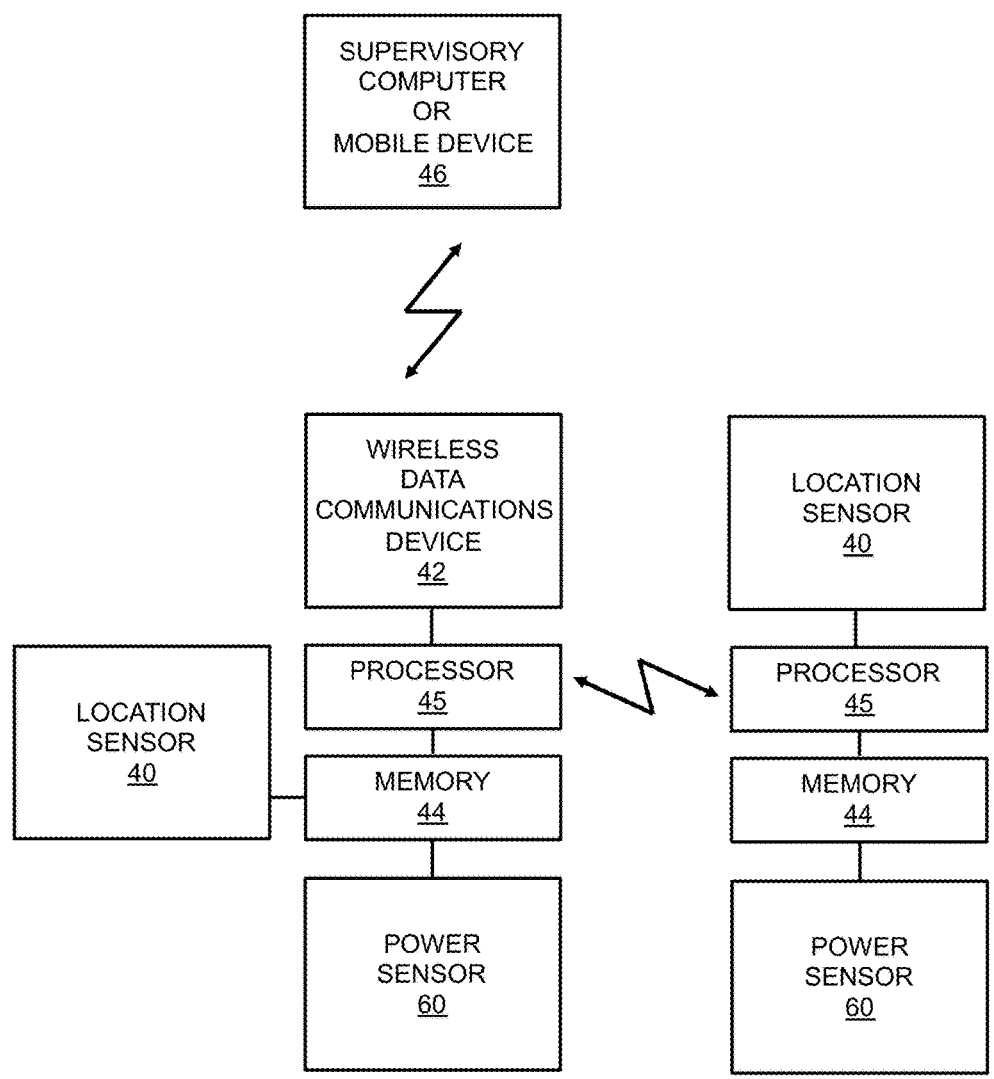
FIG. 6B is a block diagram showing a fourth method of position-based predictive analytics using multiple processors 45 interconnected wirelessly.

FIG. 6B illustrates the fourth method wherein a plurality of processors 45, each with their own location sensor 40, processor 45, memory 44, and power sensor 60, from more than one wheel tower structure 30, are interconnected wirelessly using a series of ZigBee radios, XBee radios, WPANs (wireless personal area networks) such as Bluetooth or Wi-Fi, digital radios, analog radios, spread spectrum radios, etc. Only one processor 45 may then need to be connected to the wireless data communications devices 42 for wirelessly communicating data with a remote supervisory computer or mobile device 46 or similar. It is worth noting that any combination of the above wired and wireless interconnectivity methods could be used.

Figure 7A:
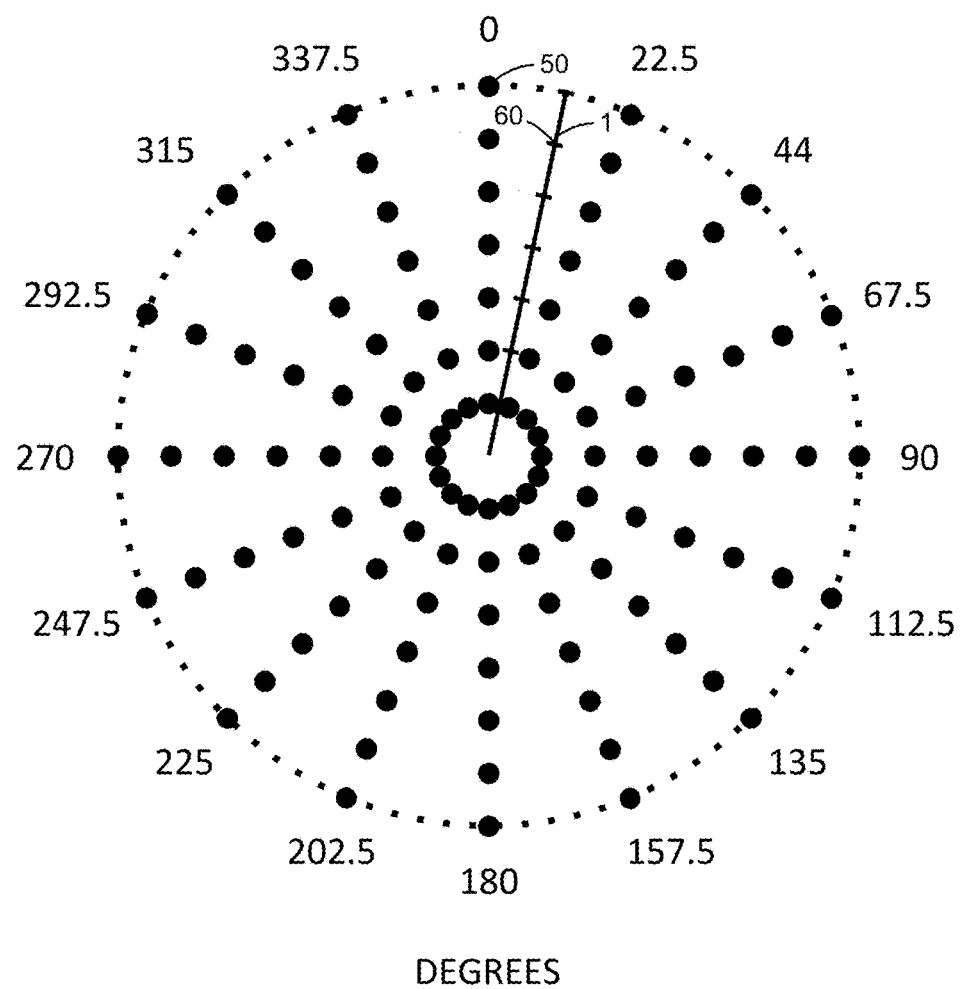
FIG. 7A is an above view of an irrigation system 1 and circular field with power sensors 60 and their corresponding position-based electric power data nodes 50 at each site-specific electric power data 64 collection location in the field with a corresponding angular degree of the irrigation system 1 operating inside a normal range of variable-speed drive assembly 35 functionality.

FIG. 7A illustrates an above view of an irrigation system 1 and circular field with power sensors 60 and their corresponding position-based electric power data nodes 50 at each site-specific electric power data 64 collection location in the field with a corresponding angular degree of the irrigation system 1 operating inside a normal range of variable-speed drive assembly 35 functionality.

Figure 7B:
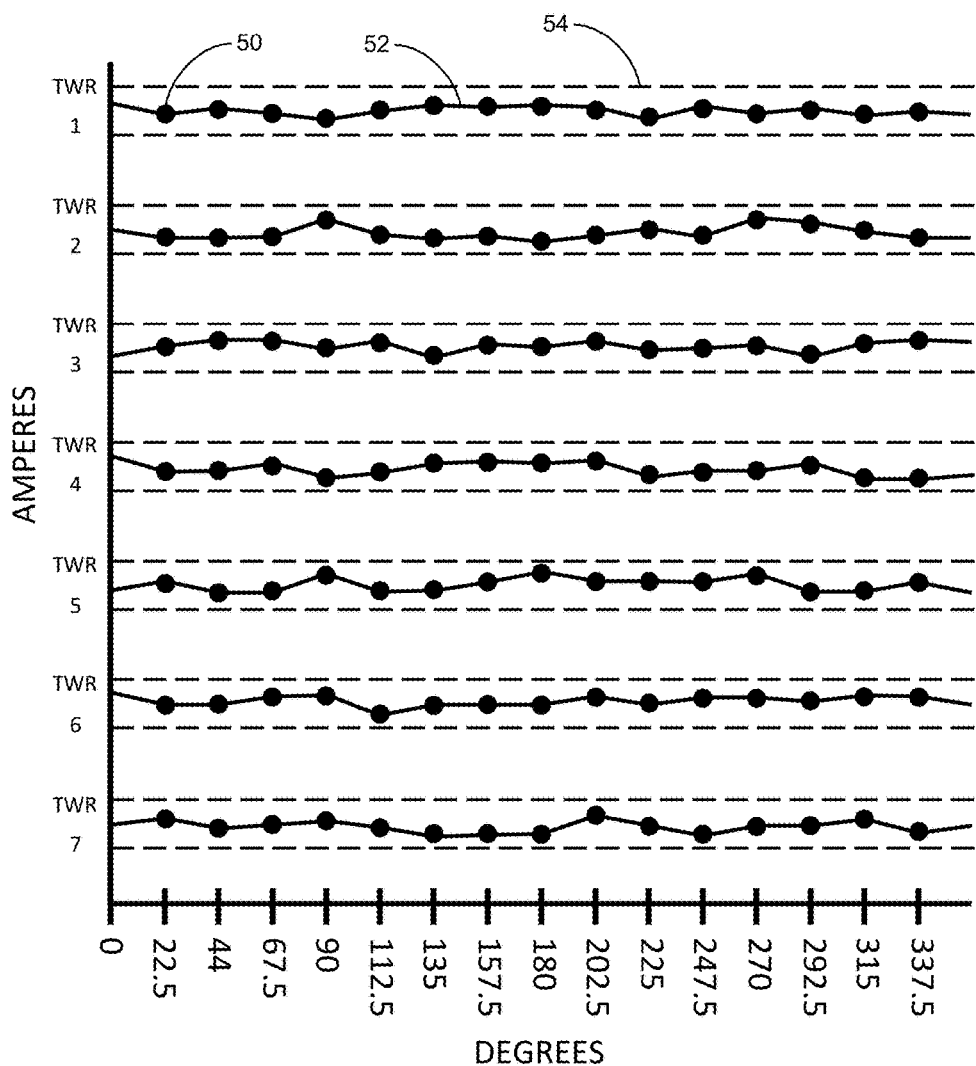
FIG. 7B is a graph showing historical electric power data trends 52 referenced by multiple position-based electric power data nodes 50 and relative to the acceptable electric power data thresholds 54 plotted against a corresponding angular degree of an irrigation system 1 operating inside a normal range of variable-speed drive assembly 35 functionality.

FIG. 7B is a graph showing historical electric power data trends 52 referenced by multiple position-based electric power data nodes 50 and relative to the acceptable electric power data thresholds 54 plotted against a corresponding angular degree of an irrigation system 1 operating inside a normal range of variable-speed drive assembly 35 functionality.

Figure 8A:
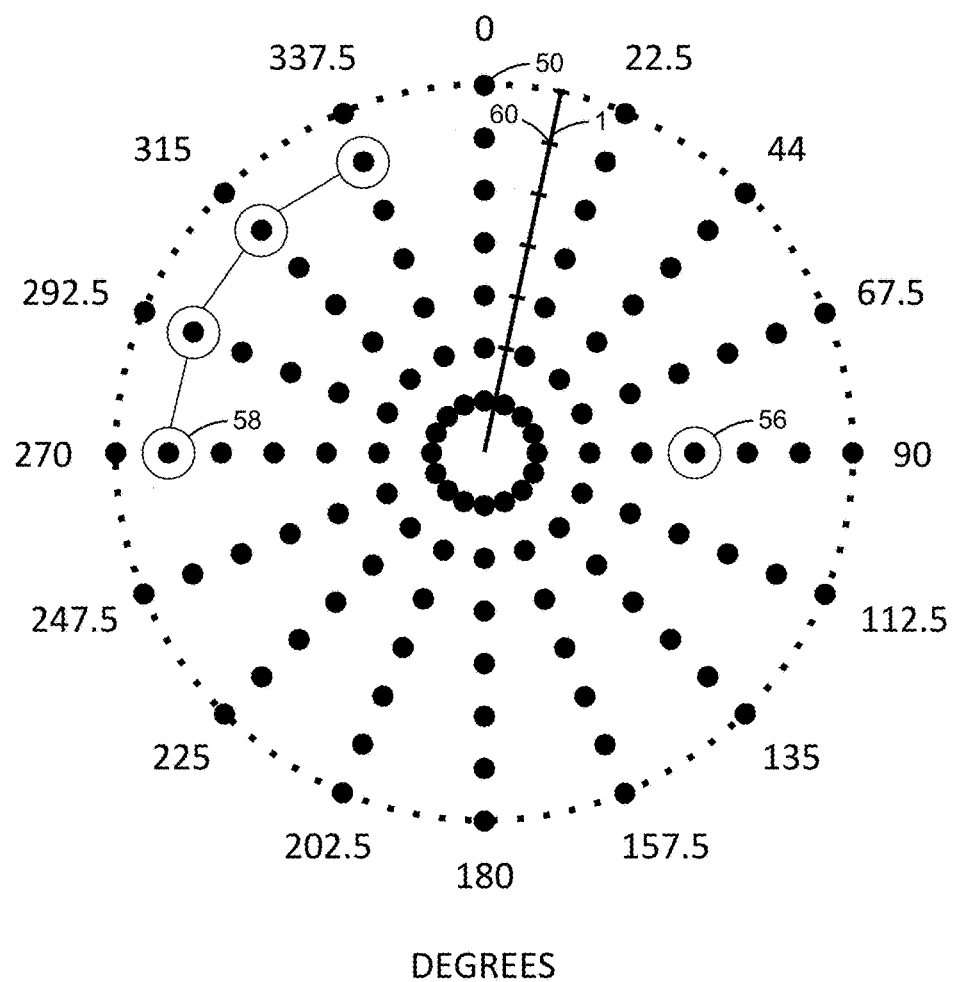
FIG. 8A is an above view of an irrigation system 1 and circular field with power sensors 60 and the corresponding position-based electric power data nodes 50 at each site-specific electric power data 64 collection location in the field with a corresponding angular degree of the irrigation system 1 operating outside a normal range of variable-speed drive assembly 35 functionality.

FIG. 8A illustrates an irrigation system 1 and circular field with power sensors 60 and the corresponding position-based electric power data nodes 50 at each site-specific electric power data 64 collection location in the field with a corresponding angular degree of the irrigation system 1 operating outside a normal range of variable-speed drive assembly 35 functionality.

Figure 8B:
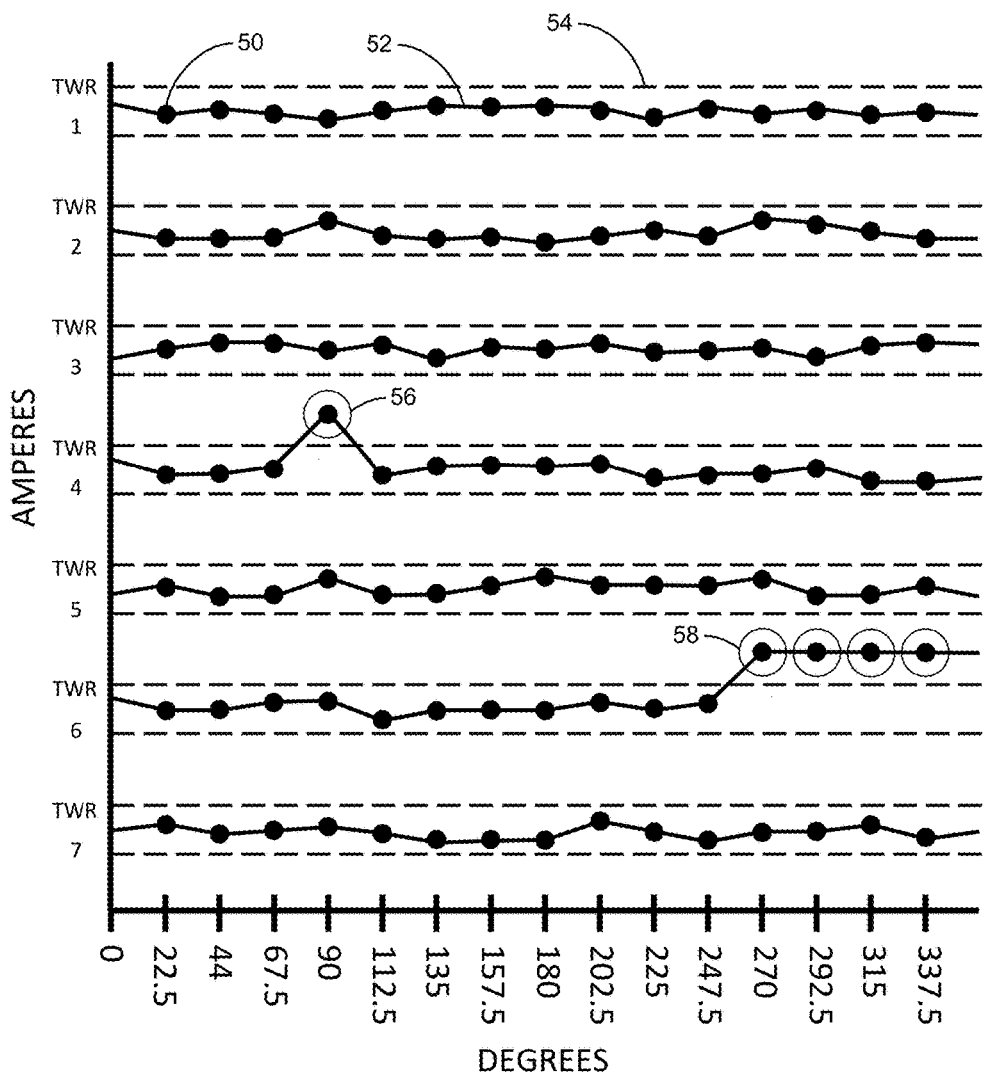
FIG. 8B is a graph showing historical electric power data trends 52 referenced by multiple position-based electric power data nodes 50 and relative to the acceptable electric power data thresholds 54 plotted against a corresponding angular degree of an irrigation system 1 operating outside a normal range of variable-speed drive assembly 35 functionality.

FIG. 8B is a graph showing historical electric power data trends 52 referenced by multiple position-based electric power data nodes 50 and relative to the acceptable electric power data thresholds 54 plotted against a corresponding angular degree of an irrigation system 1 operating outside a normal range of variable-speed drive assembly 35 functionality.

For example, the fourth wheel tower structure 30 highlights a single event anomaly 56 from acceptable electric power data thresholds 54 of historical electric power data trends 52 at an angular 90 degree rotation from center pivot tower 2 of irrigation system 1, wherein the single event anomaly 56 may be indicative of a site-specific location in the field where a wheel 36 tire may be slipping or getting stuck in the mud. Furthermore, the sixth wheel tower structure 30 highlights a multiple event anomaly 58 from acceptable electric power data thresholds 54 of historical electric power data trends 52 at an angular 270 degree rotation and above from center pivot tower 2 of irrigation system 1, wherein, the multiple event anomaly 58 may be indicative of a drivetrain component, e.g., variable-speed drive controller 39, electric motor 38, wheel gearbox 32, wheel 36, of the sixth tower's variable-speed drive assembly 35 that may be problematic and likely to cause a catastrophic failure of irrigation system 1 if not repaired.

Either of these single event anomalies 56 or multiple event anomalies 58 may be used to trigger a real-time status notification to the irrigation system 1 operator alerting an immediate need for a preventative maintenance visit to the problematic variable-speed drive assemblies 35 and corresponding site-specific locations in the field to avoid costly irrigation system 1 downtime.

Figure 9:
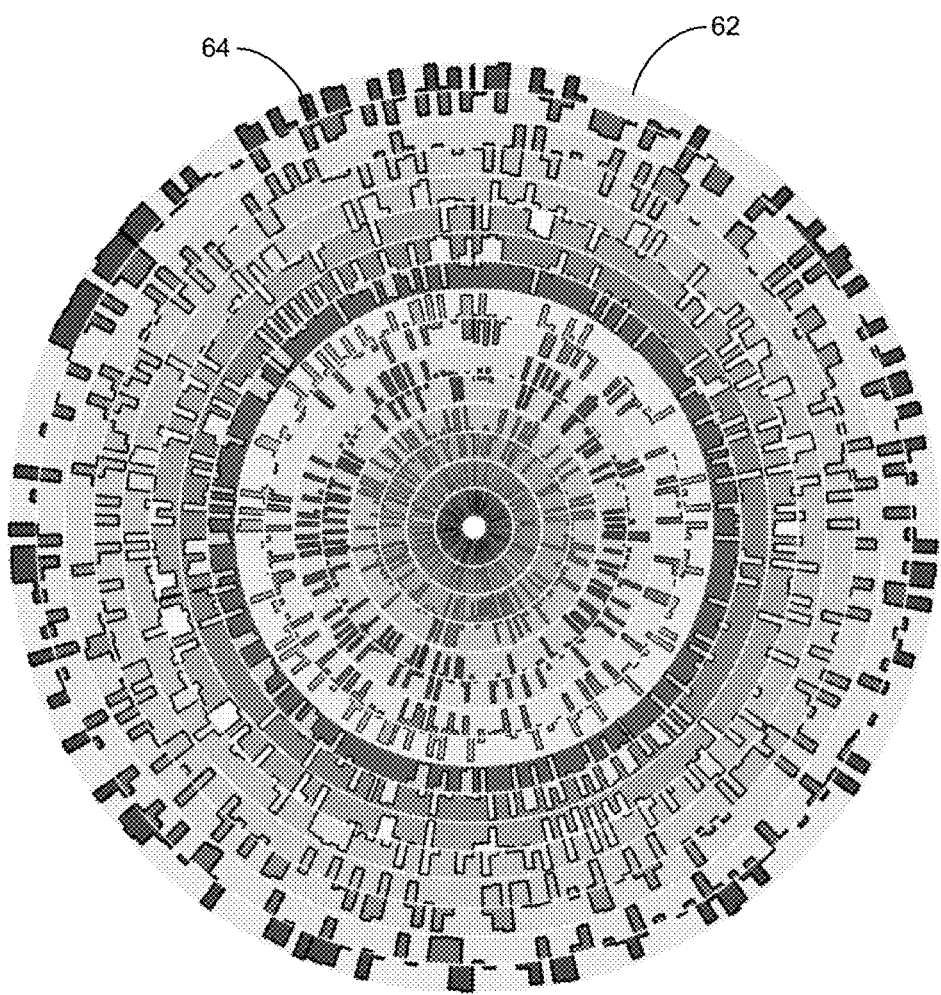
FIG. 9 is an example of an electric power data heat map 62 that shows actual graphical plots of individual electric power data 64.

FIG. 9 is an example of an electric power data heat map 62 that shows actual plots of individual electric power data 64 of an irrigation system 1 with a total of sixteen wheel tower structures 30.

Figure 10:
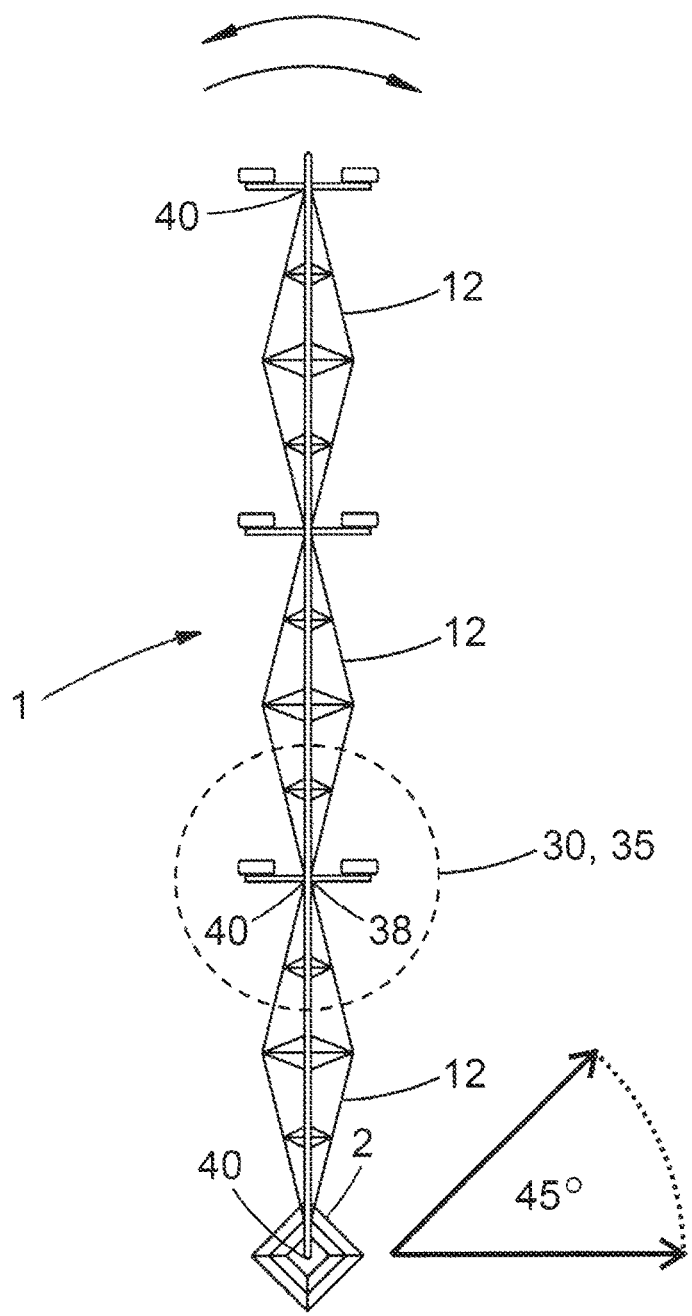
FIG. 10 is a diagram showing a top view of an irrigation system 1 with a fixed center pivot tower 2, a wheel tower structures 30, a variable-speed drive assembly 35, irrigator spans 12 and location sensors 40.

FIG. 10 illustrates an irrigation system 1 with a fixed center pivot tower 2, a wheel tower structures 30, a variable-speed drive assembly 35, an electric motor 38, irrigator spans 12 and location sensors 40. One possible method to determine the location of the electric motor 38 of the variable-speed drive assembly 35 may be to place a location sensor 40 at the center pivot tower 2, at the wheel tower structure 30, at the end of the irrigation system 1 or at any location along the length of the irrigation system 1 then simply calculate the site-specific electric motor 38 location by way of the electric motor 38 distance from the center pivot tower 2 in combination with the irrigation systems 1 degree of angular position between the electric motor 38 and the fixed center pivot tower 2 relative to 0 degrees north, 90 degrees east, 180 degrees south and 270 degrees west for example.

Although the subject matter has been described in language specific to structural features or process operations, it is to be understood that the subject matter defined is not necessarily limited to the specific features or acts described above. Rather, the specific features and acts described above are disclosed as example forms of implementation.

We claim:

1. A method to detect anomalies in operation of an irrigation system having a variable-speed drive assembly with an electric motor moving the irrigation system over a range of locations; said method comprising:
   storing electric power data for the motor as a function of the location of the irrigation system;
   periodically obtaining electric power data for the motor and determining the location of the irrigation system;
   comparing the obtained electric power data against historical electric power data for the location of the irrigation system;
   generating a notification if the obtained electrical power data is outside predetermined limits based on the stored electrical power data for the position of the irrigation system; and
   updating the stored electrical power data to reflect the obtained electrical power data.

2. The method of claim 1 wherein the variable speed drive includes a variable speed drive controller furnishing electrical power to the motor, and the step of periodically obtaining electrical power data for the motor comprises reading said electrical power data from the variable speed drive controller.

3. The method of claim 1 wherein the step of periodically obtaining electrical power data from the motor comprises reading said electrical power data from a power sensor.

4. The method of claim 1 wherein the step of determining the location of the irrigation system comprises determining the location of the motor.

5. The method of claim 1 wherein the irrigation system pivots about a center point, and wherein the step of determining the location of the irrigation system comprises measuring the angular position of the irrigation system about the center point.

6. An irrigation system comprising:
   a variable-speed drive assembly having an electric motor moving the irrigation system over a range of locations;
   a power sensor sensing electric power for the motor;
   a location sensor sensing the location of the irrigation system;
   a memory storing electric power data for the motor as a function of the location of the irrigation system;
   a processor:
   (a) periodically obtaining electric power data for the motor from the power sensor;
   (b) receiving location data from the location sensor regarding the location of the irrigation system;
   (c) retrieving stored electrical power data from memory for the location of the irrigation system;
   (d) comparing the obtained electric power data against the historical electric power data for the location of the irrigation system;
   (e) generating a notification if the obtained electric power data is outside predetermined limits based on the historical electric power data for the location of the irrigation system; and
   (f) updating the stored electrical power data in the memory to reflect the obtained electrical power data.

7. The irrigation system of claim 6 wherein the variable speed drive further comprises a variable speed drive controller furnishing electrical power to the motor, and wherein the processor periodically obtains the electrical power data for the motor by reading said electrical power data from the variable speed drive controller.

8. The irrigation system of claim 6 wherein location sensor measures the location of the motor.

9. The irrigation system of claim 6 wherein the irrigation system pivots about a center point, and wherein the location sensor measures the angular position of the irrigation system about the center point.

10. A method to detect anomalies in operation of an irrigation system having a variable-speed drive assembly with an electric motor moving the irrigation system over a range of locations; said method comprising:

storing electric power data for the motor as a function of the location of the irrigation system;

periodically obtaining electric power data for the motor and determining the location of the irrigation system by determining the location of the motor;

comparing the obtained electric power data against historical electric power data for the location of the irrigation system;

generating a notification if the obtained electrical power data is outside predetermined limits based on the stored electrical power data for the position of the irrigation system; and updating the stored electrical power data to reflect the obtained electrical power data.

11. The method of claim 10 wherein the variable speed drive includes a variable speed drive controller furnishing electrical power to the motor, and the step of periodically obtaining electrical power data for the motor comprises reading said electrical power data from the variable speed drive controller.

12. The method of claim 10 wherein the step of periodically obtaining electrical power data from the motor comprises reading said electrical power data from a power sensor.

* * * * *